(12) United States Patent
Genito et al.

(10) Patent No.: US 10,782,146 B2
(45) Date of Patent: Sep. 22, 2020

(54) SYSTEM AND METHOD FOR ANGLE OF ATTACK INDICATION WITH NO DEDICATED SENSORS AND AIRCRAFT INFORMATION

(71) Applicants: Aspen Avionics, Inc., Albuquerque, NM (US); Centro Italiano Ricerche Aerospaziali S.P.C.A., Capua (IT)

(72) Inventors: Nicola Genito, Benevinto (IT); Federico Corraro, Maddaloni (IT); Luca Garbarino, Vitulazio (IT); Antonio Vitale, Caivano (IT); Ettore De Lellis, Albuquerque, NM (US); David Bibby, Cave Creek, AZ (US); Sean Rieb, Albuquerque, NM (US); Kevin Glen Jones, Rio Rancho, NM (US)

(73) Assignees: ASPEN AVIONICS, INC., Albuquerque, NM (US); CENTRO ITALIANO RICHERCHE AEROSPAZIALI S.P.C.A., Capua (IT)

( * ) Notice: Subject to any disclaimer, the term of this patent is extended or adjusted under 35 U.S.C. 154(b) by 0 days.

(21) Appl. No.: 15/990,663

(22) Filed: May 27, 2018

(65) Prior Publication Data
US 2018/0274939 A1 Sep. 27, 2018

Related U.S. Application Data

(63) Continuation of application No. 15/093,369, filed on Apr. 7, 2016, now Pat. No. 9,983,023.
(Continued)

(51) Int. Cl.
*G01C 23/00* (2006.01)
*G06F 8/61* (2018.01)
*B64D 43/02* (2006.01)

(52) U.S. Cl.
CPC ............ *G01C 23/00* (2013.01); *B64D 43/02* (2013.01); *G06F 8/61* (2013.01)

(58) Field of Classification Search
CPC ............ G01C 23/00; B64D 43/02; G06F 8/61
See application file for complete search history.

(56) References Cited

U.S. PATENT DOCUMENTS 5,595,357 A * 1/1997 Catlin .................... B64D 43/02
244/1 R
6,980,128 B2 12/2005 Godard et al.
(Continued)

FOREIGN PATENT DOCUMENTS

CN 107980031 A 5/2018
EP 3280645 A 2/2018
(Continued)

OTHER PUBLICATIONS

Communication pursuant to Rules 70(2) and 70a(2) EPC received for EP Application No. 16777305.0 dated Dec. 11, 2018.
(Continued)

*Primary Examiner* — Yuen Wong
(74) *Attorney, Agent, or Firm* — Kutak Rock LLP

(57) ABSTRACT

A system for and method of indicating an angle of attack of an aircraft is provided. The system utilizes measurements from existing aircraft sensors so that a dedicated angle of attack sensor is not required. The system enables and benefits from a unique method that includes performing standard flight operations during a calibration flight. The system does not need any aerodynamic model of the aircraft because it utilizes information from the calibration flight to develop an estimated aerodynamic model of the specific airplane. The system utilizes the aerodynamic model and other information to estimate an angle of attack of the aircraft during flight. Finally, the system utilizes additional information to indicate the estimated angle of attack of the
(Continued)

aircraft relative to an optimum angle of attack for the aircraft and/or a critical angle of attack of the aircraft. The system further enables recalibration, so as to accommodate aircraft aerodynamic modifications.

13 Claims, 7 Drawing Sheets

Related U.S. Application Data

(60) Provisional application No. 62/144,047, filed on Apr. 7, 2015, provisional application No. 62/318,520, filed on Apr. 5, 2016.

(56) References Cited

U.S. PATENT DOCUMENTS

| | | | |
|---|---|---|---|
| 9,983,023 B2 | 5/2018 | Genito et al. | |
| 2003/0193411 A1* | 10/2003 | Price | G01C 23/005 340/973 |
| 2004/0183699 A1 | 9/2004 | Vialleton et al. | |
| 2006/0212182 A1* | 9/2006 | Shaw | B64D 43/00 701/12 |
| 2016/0298985 A1 | 10/2016 | Genito et al. | |

FOREIGN PATENT DOCUMENTS

| | | |
|---|---|---|
| WO | 2014074564 | 5/2014 |
| WO | 2016164624 A1 | 10/2016 |

OTHER PUBLICATIONS

International Preliminary Report on Patentability and Written Opinion received for Application No. PCT/US2016/026503, dated Oct. 10, 2017, 16 pages.
International Search Report and Written Opinion for International Application No. PCT/US2016/026503, dated Aug. 2, 2016, 18 pages.
Non-Final Rejection received for U.S. Appl. No. 15/093,369 dated Jun. 8, 2017, 17 pages.
Notice of Allowance received for U.S. Appl. No. 15/093,369, dated Jan. 24, 2018, 17 pages.
Written Opinion and International Search Report for PCT/US2016/026503 dated Aug. 2, 2016.
Extended European Search Report for EP16777305.0-1003/3280645, dated Nov. 22, 2018.
"Communication Pursuant to Article 94(3) EPC Received for European Patent Office Application No. 16777305.0, dated Apr. 3, 2020, 6 pages."

* cited by examiner

SYSTEM AND METHOD FOR ANGLE OF ATTACK INDICATION WITH NO DEDICATED SENSORS AND AIRCRAFT INFORMATION

CROSS-REFERENCE TO RELATED APPLICATIONS

The present application is a continuation application of U.S. patent application Ser. No. 15/093,369 filed Apr. 7, 2016, now U.S. Pat. No. 9,983,023, which claims priority pursuant to 35 U.S.C. 119(e) to U.S. Provisional Patent Application Ser. Nos. 62/144,047, filed Apr. 7, 2015, and 62/318,520, filed Apr. 5, 2016, the entire disclosures of which are incorporated herein by reference.

FIELD OF THE INVENTION

The present invention relates generally to aircraft systems and methods of determining flight information. More specifically, the present invention is concerned with systems for, and methods of, determining the angle of attack of an aircraft.

BACKGROUND OF THE INVENTION

Whether during an emergency situation or during a routine flight operation, knowledge of an angle of attack of an aircraft can help a pilot of the aircraft perform safer and more stable maneuvers. Because pilots are often inundated with information, an indication of an angle of attack relative to an optimum and/or critical angle of attack can be even more useful. For instance, while an instrument indicating an angle of attack is useful to a pilot that knows the aircraft well enough to immediately understand how the indication relates to an optimum and/or critical angle of attack for the particular aircraft in a particular configuration and/or in certain circumstances, an indication of the relationship of an angle of attack to an optimum and/or critical angle of attack is useful to a pilot regardless of how well the pilot knows the aircraft. Consequently, it would be beneficial to have an angle of attack indication system and method for determining and indicating an angle of attack of an aircraft relative to an optimum and/or critical angle of attack of the aircraft.

Many existing angle of attack systems require dedicated sensors and/or knowledge of aerodynamic parameters of an aircraft. These limitations make it complex to install these systems onto an existing aircraft and/or render the systems ineffective and/or unreliable when aerodynamic and/or other changes and/or modifications are made to an aircraft already having such a system. Consequently, it would be beneficial to have an angle of attack indication system and method that does not require a dedicated sensor. It would further be beneficial to have an angle of attack indication system that utilizes a calibration process to estimate aerodynamic parameters of the aircraft so that the system can be installed on a variety of existing aircraft and so that the system can remain useful and reliable even after the aircraft is modified by performing a new calibration process.

Because pilots often rely on information such as an angle of attack indication, it is imperative that the information be as accurate as possible, as reliable as possible, and as up-to-date as possible. Consequently, it would be beneficial to have an angle of attack indication system and method that obtains information from navigation sensors that are more reliable than, have lower noise than, and have faster responses than dedicated angle of attack sensors. And because inaccurate information can be more dangerous to a pilot than no information at all, it would be beneficial to have an angle of attack indication system and method that provides an indication of an anomaly and/or does not display an angle of attack indication if an anomaly is detected.

A variety of existing systems for and/or methods of calculating an angle of attack of an aircraft include one or more dedicated sensor. For instance, U.S. Published Application No. 2014/0230539, the entire disclosure of which is incorporated herein by reference, teaches a special probe having a rotating fin; U.S. Published Application No. 2014/0053644, the entire disclosure of which is incorporated herein by reference, teaches a wall tap port inlet; U.S. Pat. No. 8,653,990, the entire disclosure of which is incorporated herein by reference, teaches angle of attack vanes; U.S. Pat. No. 8,620,495, the entire disclosure of which is incorporated herein by reference, teaches independent probes; U.S. Pat. No. 8,104,339, the entire disclosure of which is incorporated herein by reference, teaches ports that are coupled to pressure sensors via ducts, U.S. Pat. No. 7,377,159, the entire disclosure of which is incorporated herein by reference, teaches a plurality of mass flow sensors; U.S. Pat. No. 6,940,425, the entire disclosure of which is incorporated herein by reference, teaches pressure sensors; and U.S. Pat. No. 6,012,331, the entire disclosure of which is incorporated herein by reference, teaches unique probes. Furthermore, U.S. Pat. Nos. 5,089,968, 7,406,369, and 6,772,976, the entire disclosures of which are incorporated herein by reference, teach physical sensors for calculating and/or otherwise determining an angle of attack for an aircraft.

Other existing systems for and/or methods of calculating an angle of attack of an aircraft require knowledge of aerodynamic parameters of an aircraft that are not always available or that cannot be easily determined. U.S. Pat. No. 6,928,341, the entire disclosure of which is incorporated herein by reference, teaches a system that requires a detailed aircraft aerodynamic model. The system further requires measurements of aerodynamic control surfaces. U.S. Pat. No. 4,769,759, the entire disclosure of which is incorporated herein by reference, teaches a system that requires aerodynamic data for the aircraft, the initial gross weight of the aircraft, and the position of the aircraft's center of gravity. U.S. Pat. No. 4,046,341, the entire disclosure of which is incorporated herein by reference, teaches a system that requires an aerodynamic model of an aircraft.

Still other existing systems for and/or methods of calculating an angle of attack of an aircraft require knowledge of only inertial data and are thus not so accurate in windy and turbulent conditions. U.S. Pat. No. 6,273,370, the entire disclosure of which is incorporated herein by reference, teaches a system that requires inertial sensors, such as accelerometers, to compute an inertial estimation of the angle of attack. The system is primarily directed towards being used as a possible back-up device for systems that include one or more dedicated sensor and/or as sources for correction curves. U.S. Pat. Nos. 3,948,096 and 6,791,208, the entire disclosures of which are incorporated herein by reference, teach a system that utilizes accelerometers to derive the angle of attack of an aircraft independent of the aerodynamic characteristics of the aircraft. Such a system does not require, and would gain no benefit from, a calibration flight, so it gives only a rough estimation of the angle of attack.

SUMMARY OF THE INVENTION

The present invention comprises a system for, and method of, determining an angle of attack of an aircraft. More specifically, the present invention is aimed at providing an indication of an angle of attack of an aircraft so as to assist a pilot in avoiding hazardous conditions, such as a stall condition, and/or to give the pilot guidance for best approach angle of attack for the aircraft. In some embodiments, this information is provided to the pilot by means of a pilot-selectable graphical interface of an avionics device of the invention. Some such embodiments allow a pilot to choose between an AOA Indexer that displays various graphical symbols to indicate the AOA (reference FIG. 3), an AOA Meter that provides a graphical representation of a physical meter (reference FIG. 4), and an AOA Tape that provides a graphical indication on a vertical bar with an indicator representing the AOA (reference FIGS. 5A and 5B). In some embodiments, the vertical bar has two indicators that represent AOA with Flaps Up and Flaps Down configurations. In some embodiments, the graphical interface is a display screen of an existing aircraft instrument. In other embodiments, the graphical interface is a dedicated AOA display device.

The basic concept of the present invention comprises various algorithms for performing various functions that are performed by a processor of an avionics device of the invention. A calibration algorithm performs a calibration process during a calibration flight so as to identify aerodynamic characteristics of the aircraft, such as a lift curve and/or lift profile of the aircraft. Through the calibration process, the present invention is able to estimate an aerodynamic model for the aircraft. In some embodiments, a calibration is only required once for a particular aircraft unless a modification to the particular aircraft would cause the aerodynamic configuration of the aircraft to change. In some such embodiments, the calibration flight is always required at least once for a particular aircraft. In other such embodiments, the calibration flight must be repeated after any change to the aircraft's aerodynamics.

After the present invention is successfully calibrated, an estimation algorithm is capable of applying the estimated aerodynamic model to compute an estimation of the angle of attack of the aircraft during normal flight operations. The estimation algorithm utilizes an Extended Kalman Filter that is based on a kinematic process model, which is not dependent on an aircraft aerodynamic model or the aircraft weight, to merge sensor data with the estimated aerodynamic model. The result is an estimated angle of attack that is almost independent of the aircraft weight. In other embodiments, the present invention utilizes weight information. In some such embodiments, the weight information is measured weight information. In other such embodiments, the weight information is estimated weight information. In some embodiments, the estimated weight information is estimated by an estimation algorithm. In some such embodiments, the estimation algorithm utilizes data obtained from a calibration flight to derive the estimated weight information. In some embodiments, the angle of attack calculation is fully independent of the weight of the aircraft.

After an estimated angle of attack is successfully calculated, an indication algorithm computes an angle of attack indication by comparing the estimated angle of attack to various parameters. Some such parameters are taken directly from a pilot's operating handbook for the aircraft and input into the system. Other parameters are calculated as part of the calibration process. In some embodiments, the present invention further includes a monitoring algorithm that is capable of performing various guard functions so as to check that the system and/or the various algorithms, are working properly. In other such embodiments, the present invention includes just one algorithm that performs all of the functions necessary to calibrate the system, estimate an angle of attack, indicate the angle of attack, and/or verify that the system is working properly.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

A system for, and method of, determining an angle of attack of an aircraft will now be described in detail with reference to FIGS. 1 to 6 of the accompanying drawings. It is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Overview of Major System Components

In some embodiments of the present invention, the system is configured to be an avionics device that is installed in an aircraft so as to help a pilot of the aircraft perform safer and more stable maneuvers during a plurality of flight phases, such as take-off, cruising, and landing. In some such embodiments, the system is capable of determining an angle of attack of the aircraft and anticipating a stall speed of the aircraft.

Figure 1:
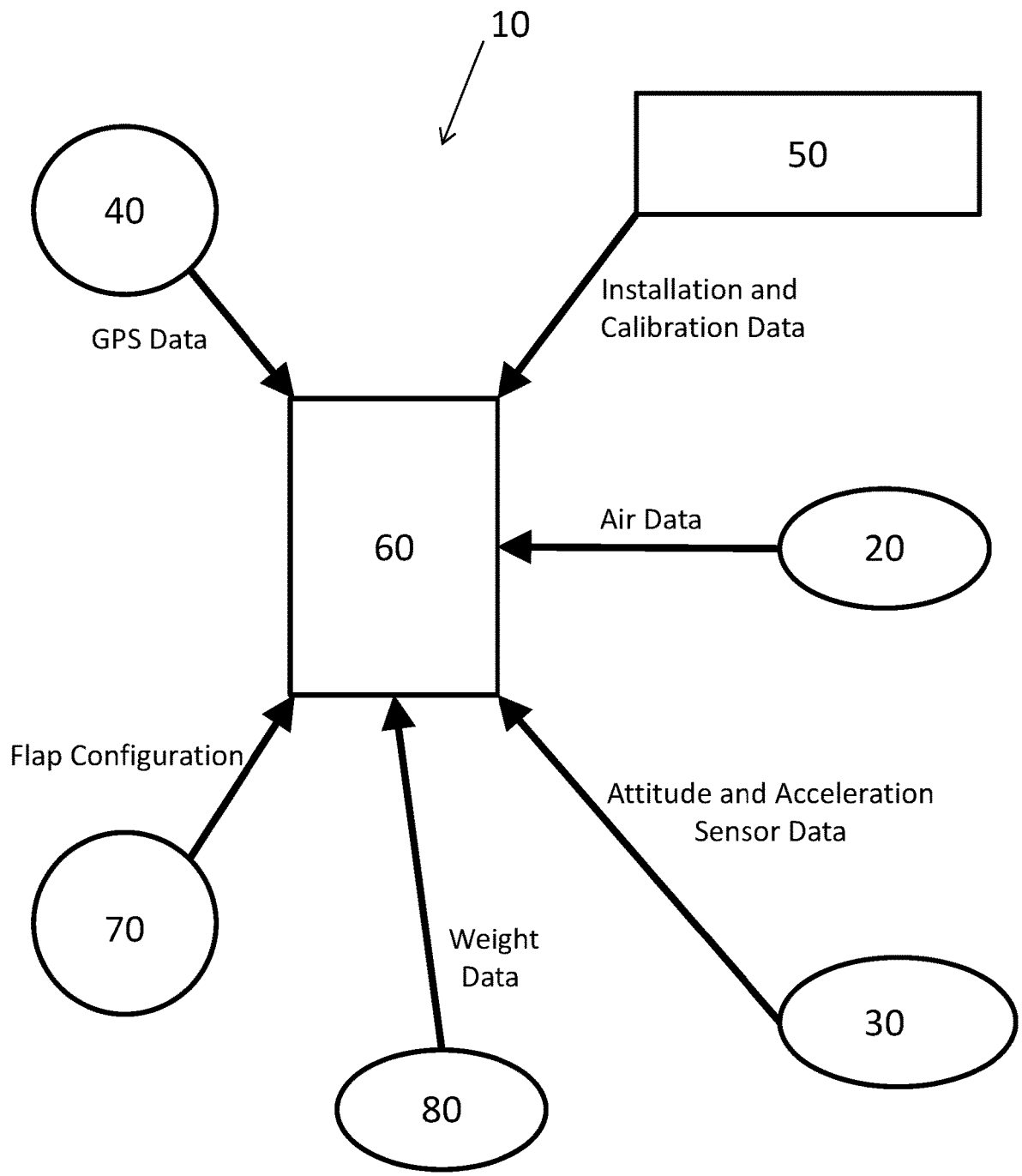
FIG. 1 is a graphical representation of various components of the present invention.
Figure 2:
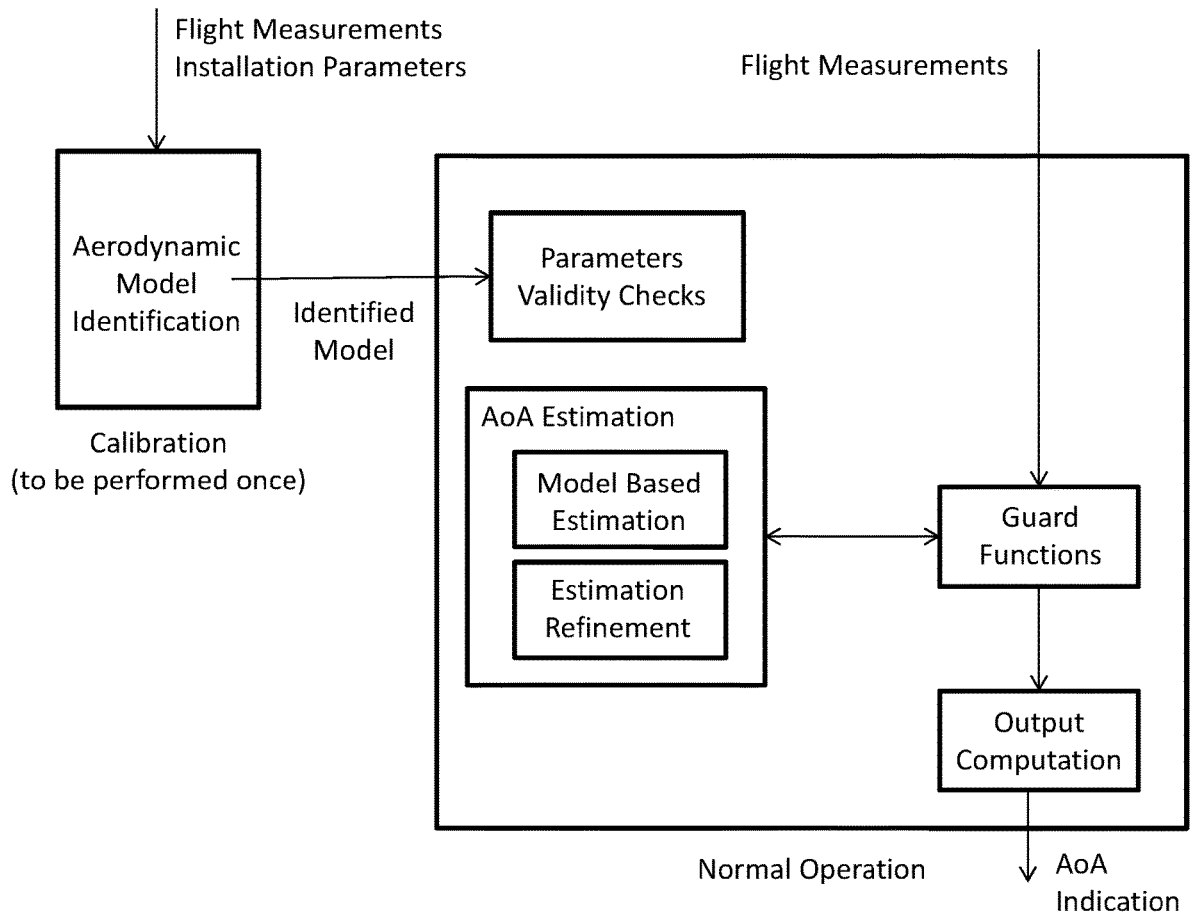
FIG. 2 is a flow chart showing the general concept of the present invention.
Figure 3:
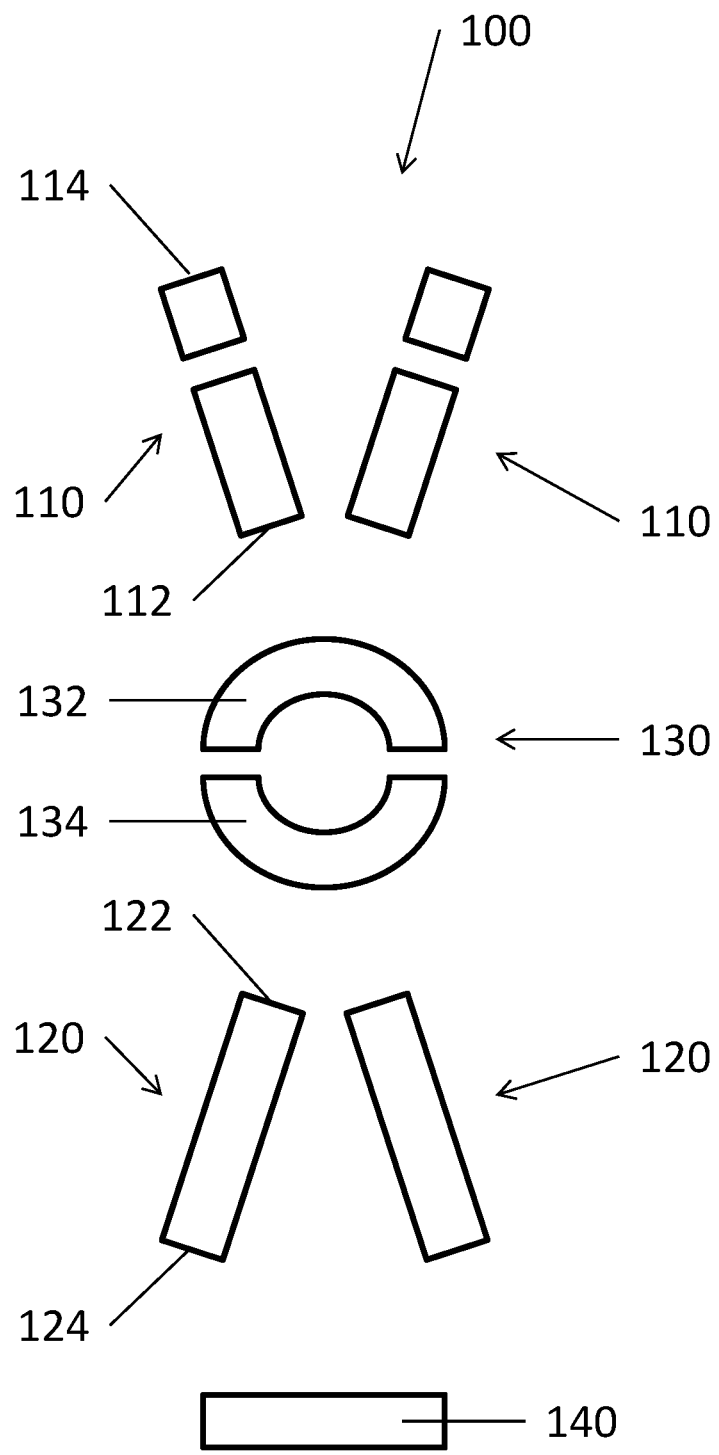
FIG. 3 is a graphical representation of one embodiment of an AOA Indexer.
Figure 4:
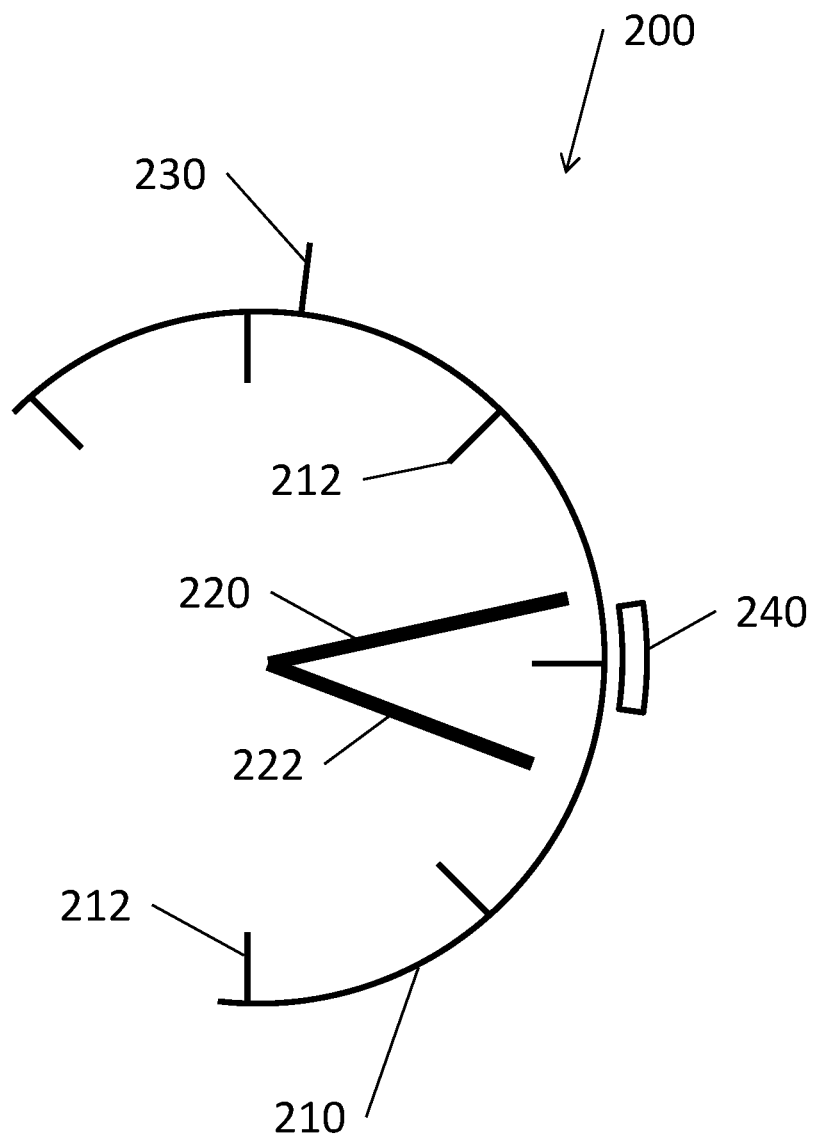
FIG. 4 is a graphical representation of one embodiment of an AOA Meter.

Referring to FIG. 1, the system 10 includes an air data computer 20, attitude and acceleration sensors system 30, a global positioning system 40, a configuration module 50, and a display screen 60, each being in data communication with a system processor (not shown) during flight operations. In some embodiments, the system 10 further includes a flap configuration system 70 and a Flight Management System 80 for gathering current aircraft weight. In some embodiments, the Flight Management System 80 comprises a weight sensor. In other embodiments, the Flight Management System 80 comprises a user input device so as to enable a user to input weight information, such as measured weight information and/or estimated weight information. A method of using the system to determine an angle of attack of the aircraft includes providing the system with some information prior to a calibration process, generating additional information during a calibration process, using the information to estimate an angle of attack of the aircraft during flight operations, and providing an indication of the angle of attack of the aircraft to a pilot of the aircraft.

The air data computer 20 is configured to supply Air Data to the system processor during flight operations. In some embodiments of the present invention, Air Data includes data such as calibrated air speed, indicated air speed, true air speed, altitude, and/or altitude trend data, such as climb rate data and/or barometric vertical speed, or the like. In some such embodiments, Air Data is derived from air pressure data received from the aircraft's pitot-static system. In other such embodiments, Air Data is gathered from an air data computer model.

Attitude and acceleration sensors system 30 is configured to supply Aircraft Data to the system processor during flight operations. In some embodiments of the present invention, Aircraft Data includes data such as the rate of angular movement of the aircraft, accelerations experienced by the aircraft, and/or the attitude and orientation of the aircraft, such as the pitch angle, the roll angle, and the heading angle of the aircraft. In some embodiments, the Aircraft Sensors are supplied by an Attitude Heading Reference System (AHRS).

The global positioning system 40 is configured to supply Position and Velocity Data to the system processor during flight operations. In some embodiments of the present invention, Position and Velocity Data includes data such as the ground speed of the aircraft and/or track angle data of the aircraft. In some such embodiments, the Position and Velocity Data is gathered from a GPS module of a main application processor. In other such embodiments, the Position and Velocity Data is received from an external GPS.

The configuration module 50 is configured to store Calibration Parameters and Installation Parameters. In some embodiments, Calibration Parameters include parameters that are generated during a calibration process, such as indicated airspeed and/or pitch angle of the aircraft. In other embodiments, Installation Parameters include Flight Manual Parameters and a Calibration Estimated Weight. In some such embodiments, Flight Manual Parameters include parameters that are usually available in a pilot operating handbook of the aircraft, such as flap up stall speed ("$V_S$"), full flap stall speed ("$V_{SO}$"), maximum structural cruising speed ("$V_{NO}$"), never exceed speed ("$V_{NE}$"), maximum flaps extended speed ("$V_{FE}$"), maneuvering speed ("$V_a$"), approach speed with full flaps ("$V_{Appr\_Spd}$"), maximum take-off weight ("$W_{MTOW}$"), and/or standard empty weight ("$W_{SEW}$"). In other such embodiments, the Calibration Estimated Weight is the estimated take-off weight of the aircraft for a flight in which a calibration process is conducted.

In some embodiments, Calibration Parameters and Installation Parameters are stored on a removable device, such as an SD Card. In such embodiments the system includes a means of reading information from and/or writing information to the removable disk. In other such embodiments, the removable disk includes a software package for updating an existing system of the aircraft, such as ASPEN's Evolution Flight Display. In such an embodiment, the update enables the existing system to function as at least part of the system of the present invention.

The display screen 60 is configured to provide a user with information. In some embodiments, the present invention further includes one or more user interfaces for receiving various information from a user. In some such embodiments, the user interface is incorporated into the display screen 60. For instance, a calibration view of the display screen 60 is configured to receive an input from a user, such as to turn a calibration process on or off and/or to acquire a set-point of data during a calibration process. In various embodiments of the present invention, the system is configured to receive various other information from users and/or from various components, including validation flags that are received from the same source as other information and that provide an indication of whether the other information is valid or not.

In some embodiments, a flap configuration system is used to provide the flap configuration of the airplane. In some such embodiments, the flap configuration determines the flap position by measuring the actual configuration of the flaps. In other such embodiments, the flap configuration determines the flap position by providing a manual control, which the pilot sets to a desired flap position. In some embodiments, the manual control causes the flaps on the aircraft to change configuration. In other embodiments, the manual control is separate from a control that causes the flaps on the aircraft to change configuration.

In some embodiments, the current weight of the aircraft is not available and/or not needed. In some other embodiments the current weight data is gathered from one or more device or system, such as a Flight Management System 80. In some further embodiments, the current aircraft weight is directly inserted by the pilot before flight or it is roughly estimated by the algorithm soon after take-off. In some embodiments, a user input device and/or weight sensor is utilized for determining the weight of the aircraft.

Method of Calibrating the System

The present invention further includes a method of calibrating the system 10. In some embodiments, a calibration process is initiated during a calibration flight while the system processor is receiving Calibration Flight Data, such as Air Data from the air data computer 20, Aircraft Data from the attitude and acceleration sensor system 30, and/or Position and Velocity Data from the global positioning system 40. In some such embodiments, the calibration process is initiated when a command for calibration mode activation is received by the system 10. In other such embodiments, the calibration process includes a step of verifying that at least some of the Installation Parameters are stored in the configuration module 50 prior to allowing the system processor to receive Calibration Flight Data and/or prior to allowing the calibration mode to be activated.

In some embodiments of the present invention, the system provides text and/or graphical symbols on a display screen 60 so as to provide a user of the system with information pertaining to a calibration process. For instance, in some embodiments a display screen 60 provides Flight Calibration Status and/or other information pertaining to whether a certain step should be performed, whether a certain step was executed correctly, whether a certain step should be repeated, whether an error exists, and/or whether the calibration process is complete. In some embodiments, the text is a message. In some such embodiments, the display screen

60 displays a message, such as "FLY 119Kt, Flaps Up", "FLY 75Kt, Flaps Down", "FLY 119Kt, Flaps Up, PUSH START ACQUIRE", and/or some other message, when a particular step should be performed and/or when a particular step was executed correctly. In other such embodiments, the display screen 60 displays a step indicator, such as "(⅓)" and/or some other indicator, so as to indicate a number of steps to be completed, a number of steps that have been completed, and/or the current step in a multi-step process. In still other such embodiments, the display screen 60 displays a timer, countdown, and/or some other indicator, so as indicate the amount of time left in a step, such as a point acquisition step. In yet other such embodiments, the display screen 60 displays a message, such as "ACQUIRE FAILED", "ACQUISITION FAIL", and/or some other message, when a particular step should be repeated. In still other embodiments, the display screen 60 displays a message, such as "Calibration Error", "CALIBRATION FAILED", "SENSOR FAILED", "SENSOR ERROR", and/or some other message, when an error exists. In yet other embodiments, the display screen 60 displays a message, such as "Exit Calibration", "SAVE or REJECT CAL", and/or some other message, when the calibration process is complete.

In some embodiments of the present invention, at least some of the Calibration Flight Data, such as the indicated airspeed and/or the pitch angle of the aircraft, is stored in the configuration module 50 upon successful completion of a calibration process. In some such embodiments, some or all of the Calibration Flight Data stored in the configuration module 50 is stored as a Calibration Parameter.

In some embodiments of the present invention, the calibration process includes recording data for a plurality of flight scenarios so as to obtain a plurality of set points of data. One such calibration process includes three set points at level flight with: data for the first set point being recorded while the aircraft is in a clean configuration and flying at the cruise airspeed; data for the second set point being recorded while the aircraft is in a clean configuration and flying at an airspeed that is slower than the cruise airspeed, such as, in some instances, an airspeed that is equivalent to 1.3 times the flap up stall airspeed; and data for the third set point being recorded while the aircraft is in a dirty configuration and flying at an airspeed that is typical of approach speeds, such as 1.3 times the flap down stall airspeed. In some such embodiments, airspeeds from the Pilot Operating Handbook, such as the Short Field Approach Speed at maximum Gross Weight, the Normal Approach Speed at maximum Gross Weight, and/or some other airspeed from the Pilot Operating Handbook is utilized as a target airspeed for recording one or more set point, such as the second and/or the third set point. In some such embodiments, the highest dirty configuration approach speed provided in the Pilot Operating Handbook is the target airspeed.

In some embodiments, the Calibration Parameters include cruise airspeed ("$IAS_C$"), clean optimum descend airspeed ("$IAS_O$"), flapped optimum airspeed, cruise pitch angle ("$\vartheta_C$"), clean optimum descend pitch angle ("$\vartheta_O$"), and flapped optimum pitch angle.

In some embodiments, the calibration process includes two set points at level flight in clean configuration and two set points at level flight in flapped configuration. In other embodiments, the calibration process includes two set points at level flight in clean configuration, one or two set points at level flight in flapped configuration, and one or two additional set points at level flight to identify the aircraft aerodynamics when other secondary surfaces are deployed (such as Slats or the like). In still other embodiments, such as embodiments whereas the aircraft does not have flaps, the calibration process only includes two set points at level flight in clean configuration. In all such embodiments, the Calibration Parameters include airspeed and pitch angle measurement for each set point acquired.

In some embodiments, the Calibration Parameters include a calibration validity input. In some such embodiments, the calibration validity input is set to one when the calibration process is completed correctly and is set to zero when the calibration process is completed incorrectly. In this way, the system is able to use one Calibration Parameter to assess the reliability of the other Calibration Parameters. In some such embodiments, the system will only store the Calibration Parameters in the configuration module if the calibration validity input indicates that the calibration process was completed correctly.

Some methods of calibrating the system 10 are accomplished in just one calibration flight by performing common piloting maneuvers. In some embodiments, a calibration phase of a calibration flight is started by selecting a "Start Calibration" button. In some such embodiments, the "Start Calibration" button is a physical button. In other such embodiments, the "Start Calibration" button is a virtual button displayed on the display screen 60.

During a calibration phase, the system provides the pilot with instructions for obtaining one or more set point. In some embodiments, the instructions state "Fly 120 Knots Flap Up", "Fly 88 Knots Flap Up", "Fly 77 Knots Flap Down", or some other similar instruction, so as to inform the pilot how to trim the aircraft in level flight. When the aircraft is at level flight with the suggested airspeed and with the suggested dirty configuration, the pilot is able to acquire a set point by pushing a "Start Acquire" button. In some embodiments, the "Start Acquire" button is a physical button. In other embodiments, the "Start Acquire" button is a virtual button displayed on the display screen 60. In still other embodiments, the system provides an indication that the "Start Acquire" button was successfully selected and/or that the system is currently acquiring data. In some such embodiments, the display screen displays a message such as "ACQUIRING: 120 Knots Flap Up", "ACQUIRING: FLY 88 Knots Flap Up", "(⅔) ACQUIRING: FLY 77 Kt 1:05 REMAINING", or some other similar message.

In some embodiments, the pilot must hold the aircraft in the particular flight condition while the system is acquiring data. In some such embodiments, the acquisition time is between thirty-five (35) seconds and two (2) minutes. In other such embodiments, the acquisition time is within 1 minute and 30 seconds. In some embodiments, the system indicates whether the acquisition procedure was successful. If the acquisition procedure was unsuccessful, the system provides an indication of such. For instance, in some embodiments, the system indicates that the acquisition procedure was unsuccessful by displaying a message such as "ACQUISITION FAIL. STAND BY . . . ", "ACQUISITION FAIL: IAS", and/or by providing some other indication that the acquisition procedure was unsuccessful and/or must be repeated. In some such embodiments, the message provides an indication of why the acquisition procedure was unsuccessful and/or when the acquisition procedure failed.

If an acquisition procedure for a particular set point is successful, the system provides additional instructions, if necessary. For instance, in some embodiments, the system provides instructions pertaining to the acquisition of an additional set point. In some methods, such as methods for aircraft that do not have flaps, only two set points at level flight in clean configuration are acquired during a calibration procedure. In some such methods, the first set point is a "CRUISE" point and the second set point is an "OPTIMUM" point. In some other methods, three set points are acquired during a calibration procedure. In some such methods, the first set point is a "CRUISE" point, the second set point is an "OPTIMUM FLAP UP" point, and the third set point is an "OPTIMUM FLAP DOWN" point. In some other methods, four set points are acquired during a calibration procedure. In some such methods, the first two points are a "CRUISE" point and an "OPTIMUM" point associated with the aircraft being in a clean configuration, whereas third and fourth set points are a "CRUISE" point and an "OPTIMUM" point associated with the aircraft being in a flapped/dirty configuration. In some further methods, one additional set point for each available secondary aerodynamic surface (such as Slats or the like) is acquired during a calibration procedure. In some such methods, each additional set point is an "OPTIMUM" point associated with the aircraft being at level flight and in the aircraft aerodynamic configuration when a secondary surface is deployed. In some further methods, two additional set points for each available secondary aerodynamic surface are acquired during a calibration procedure. In some such methods, the additional set points are a "CRUISE" point and an "OPTIMUM" point associated with the aircraft being at level flight and in the aircraft aerodynamic configuration when a secondary surface is deployed.

In some embodiments, the system allows a user to save or reject calibration of the system. In some embodiments, the system prompts a user at the end of a calibration procedure to select whether to save or reject the calibration. In other embodiments, the system allows a user to save or reject one or more set point.

Calibration Calculations

One embodiment of the calibration process includes using dynamic pressure values ("Q"), pitch angle values ("θ"), the Calibration Estimated Weight of the aircraft ("$W_{cal}$" defined above), and a Conventional Weight ("$W_{conv}$" defined below) to determine calibration gains for normal operation ("$k_1$" and "$k_0$"). In some embodiments, such as embodiments where two set points are acquired for each aerodynamic configuration (clean or dirty), a first dynamic pressure value ("$Q_1$") and a first pitch angle value ("$\theta_1$") correspond with a first set point while a second dynamic pressure value ("$Q_2$") and a second pitch angle value ("$\theta_2$") correspond with a second set point. In some such embodiments, the first set point corresponds with measurements that were taken while the aircraft was flying level at cruise airspeed. In other such embodiments, the second set point corresponds with measurements that were taken while the aircraft was flying level at an optimum airspeed, such as an airspeed that is equivalent to 1.3 times the flaps-up stall airspeed. In some embodiments, the measurements include pitch angle and indicated airspeed. In some such embodiments, the calibration gains for normal operation for each aerodynamic configuration are calculated using the following equations:

$$k_1 = \frac{w_{cal}}{w_{conv}} \cdot \hat{k}_1 \quad \text{(Equation 1)}$$

$$k_0 = \frac{w_{cal}}{w_{conv}} \cdot \hat{k}_0 \quad \text{(Equation 2)}$$

wherein $$W_{ref} = C_0 + W_{SEW} + C_1 \cdot (W_{MTOW} - W_{SEW}) \quad \text{(Equation 3)}$$

-continued $$W_{conv} = \max\{W_{cal}, W_{ref}\} \quad \text{(Equation 4)}$$

$$\hat{k}_1 = \frac{s}{w_{cal}} \cdot C_{L\alpha} = \left(\frac{\frac{1}{Q_2} - \frac{1}{Q_1}}{\theta_2 - \theta_1}\right) \quad \text{(Equation 5)}$$

$$\hat{k}_0 = \frac{s}{w_{cal}} \cdot C_{L0} = \left(\frac{1}{Q_1} - \frac{\frac{1}{Q_2} - \frac{1}{Q_1}}{\theta_2 - \theta_1} \cdot \theta_1\right) \quad \text{(Equation 6)}$$

As shown in Equations 4, the Conventional Weight is the larger of the Calibration Estimated Weight and a Reference Weight ("$W_{ref}$"). In some embodiments of the present invention, the Conventional Weight is used in Equations 1 and 2 instead of the actual aircraft weight, especially in circumstances when the actual aircraft weight is not known. In other embodiments and/or in other circumstances, such as when actual aircraft weight is known and/or can be accurately estimated, the Conventional Weight in Equations 1 and 2 can be substituted with the actual or estimated aircraft weight. In many cases, such as with commercial aircraft, the weight measure/estimation is usually well known.

The Reference Weight is a derived value that is related to the standard empty weight of the aircraft, the maximum take-off weight of the aircraft, and Calibration Constants ("$C_0$" and "$C_1$"). In some embodiments, the Calibration Constants are developed during a fine-tuning process of the present invention so as to eliminate or minimize any potential errors in the present invention's estimation of an angle of attack of an aircraft. In some such embodiments, the Calibration Constants eliminate or minimize the effects of using the Conventional Weight rather than the actual aircraft weight.

Equations 5 and 6 include variables for lift aerodynamic derivatives ("$C_{1\alpha}$" and "$C_{10}$") and for the aircraft's aerodynamic reference surface ("S"). Assuming the lift coefficient is linear with respect to the angle of attack and that the contributions of aerodynamic trim and control surfaces to the lift coefficient are negligible, the aircraft lift profile ("L") for each aerodynamic configuration identified by acquiring two set points is calculated with the following equation:

$$L = Q \cdot S \cdot C_L = Q \cdot S \cdot (C_{L0} + C_{L\alpha}\alpha) = Q \cdot W_{cal'} (\hat{k}_0 + \hat{k}_1 \alpha) \quad \text{(Equation 7)}$$

The lift computed through Equation 7 depends on the aircraft weight. To account for this, the Calibration Estimated Weight, which is expected to provide a close approximation of the actual aircraft weight during the calibration process, is used in Equations 5, 6, and 7. Even if, for some reason, the Calibration Estimated Weight does not provide a close approximation of the actual aircraft weight during the calibration process, the algorithm will minimize the impact of this poor approximation.

In some other embodiments, such as embodiments where only one set point is acquired to identify the aircraft aerodynamics in a dirty configuration (when flaps or secondary surfaces are deployed), the lift is computed by adding an offset to $\hat{k}_0$ into the Equation 7, which takes into account the lift curve shift with respect to clean configuration due to aerodynamic surface deployment.

Calibration Verification

Some embodiments of the calibration process include calibration checks that are performed by a calibration verification algorithm. One embodiment of a calibration verification algorithm includes a calibration assessment algorithm that assesses whether set point information was correctly acquired. For instance, some such calibration assessment algorithms verify that all flight measurements are valid, such as by verifying that each measurement is provided by an appropriate sensor and/or that each measurement is provided with a validity flag. Other such calibration assessment algorithms verify that measurements were taken while the aircraft was in level flight, such as by assessing the vertical speed and roll angle of the aircraft and/or by comparing the absolute values of the vertical speed and roll angle to predetermined threshold values. Still other such calibration assessment algorithms verify that the measurements taken during the calibration process satisfy certain stability requirements. In other words, the calibration assessment algorithm determines the variance of one or more measurement over a specific period of time during the calibration process and compares the variance to a predetermined threshold and/or compares a slope of a linear approximation of the measurement's trend to pre-determined ranges.

Another embodiment of a calibration verification algorithm includes a calibration assessment algorithm that assesses whether a calibration procedure is being correctly executed. For instance, some such calibration assessment algorithms evaluate the pitch angle during the calibration process, such as during the acquisition of the first and/or second set of measurements, and compares the pitch angle to an estimated angle of attack that corresponds with the same instance in time or period of time as the pitch angle. In some such embodiments, the pitch angle and the estimated angle of attack are mean values that are derived from a plurality of values. In this way, the calibration assessment algorithm enables the verification of the calibration execution when the calibration gains are set equal to $\hat{k}_0$ and $\hat{k}_1$.

Algorithm Initialization

In some embodiments of the present invention, the system includes at least one algorithm for carrying out various operations before, during, and/or after normal operations. Some algorithms are configured so as to be capable of performing an initialization function that retrieves and/or determines threshold values and/or calibration gain values, such as $k_0$ and $k_1$ calculated in Equation 1. Other initialization functions verify that the Installation Parameters and the Calibration Parameters are available and/or that they are compliant with one or more initialization check constraints. Some such initialization check constraints are represented by one or more of the following equations. In some such embodiments, the offset value in Equation 10 is intended to take into account a conventional weight for the pilot and the propellant.

$$V_{NE} > V_{NO} > V_S > V_{SO} > 0 \quad \text{(Equation 8)}$$

$$V_{NE} > V_{FE} > V_S \quad \text{(Equation 9)}$$

$$W_{MTOW} > W_{cal} > W_{SEW} + \text{offset} \quad \text{(Equation 10)}$$

$$IAS_C > IAS_O > 0 \quad \text{(Equation 11)}$$

$$\vartheta_O > \vartheta_C \quad \text{(Equation 12)}$$

Angle of Attack Estimation

In some embodiments of the present invention, the system includes an estimation algorithm that is capable of performing the function of estimating an angle of attack of an aircraft. In some such embodiments, the angle of attack estimation algorithm is based on an Extended Kalman Filter ("EKF"), which combines information, such as Air Data, Aircraft Data, Position and Velocity Data, data that is received from an internal navigation system, and/or other data. In some embodiments, a filter exploits knowledge of the aircraft lift curve identified during the calibration flight, such as the lift profile calculated in Equation 7, with respect to an angle of attack.

In some embodiments of the present invention, the estimation algorithm estimates at least five variables and/or filter states. In some such embodiments, two of the variables are related to aerodynamic angles, such as angle of attack ("α") and sideslip ("β"), and the other three variables correspond to three components of wind velocity, such as wind velocity relative to a North axis ("$W_N$"), wind velocity relative to an East axis ("$W_E$"), and wind velocity relative to a Downward axis ("$W_D$") in a North-East-Downward reference axis system.

In some embodiments, aerodynamic angles estimation is based on classic flight mechanics kinematic equations in polar coordinate form. In some such embodiments, the classic flight mechanics kinematic equations are not dependent on the aircraft type or aircraft characteristics. In other embodiments, wind velocity components dynamics are modeled as Gauss-Markov processes. In some such embodiments, the related equations are not dependent on the aircraft type. In other such embodiments, the related equations are not dependent on aircraft characteristics. In still other embodiments, aircraft characteristics are estimated. In some such embodiments calibration parameters are utilized to estimate aircraft characteristics. In other embodiments, aircraft characteristics of an aircraft, estimated or otherwise, are utilized for estimating and displaying the angle of attack of the aircraft.

In some embodiments of the present invention, the estimation algorithm includes one or more measurement equations for computing one or more computed value. In some embodiments, the computed values include three components of inertial velocity and a normal component of load factor in body axis. In some such embodiments, one or more of the computed values are compared with values provided by other systems, such as velocity values provided by a global positioning system and/or accelerations provided by an inertial measurement unit. In some embodiments, comparing one or more of the computed values to values provided by other systems enables the system to generate a correction term for a filter estimation. In other embodiments, the load factor equation is dependent on the weight of the aircraft. In still other embodiments, the load factor equation is always dependent on the aircraft weight. In some such embodiments, usage of the conventional weight and/or the actual estimated/measured weight eliminates and/or reduces such dependency. In some such embodiments, an Extended Kalman Filter is utilized to correct or partially correct any potential inaccuracies associated with using a conventional weight and/or an estimated/measured weight.

In some embodiments of the present invention, the following equations, implemented in discrete form, represent EKF state equations:

$$\dot{\alpha} = \frac{1}{TAS \cdot \cos\beta} \cdot (a_z \cdot \cos\alpha - a_x \sin\alpha) + \quad \text{(Equation 13)}$$

$$q - \tan\beta \cdot (p \cdot \cos\alpha + r\sin\alpha) + \frac{1}{TAS \cdot \cos\beta} \cdot [$$

$$u_w \cdot q \cdot \cos\alpha - v_w \cdot (r \cdot \sin\alpha + p \cdot \cos\alpha) + w_w \cdot q\sin\alpha] + \eta_\alpha$$

-continued $$\dot{\beta} = \frac{1}{TAS} \cdot (-a_x \cdot \cos\alpha \cdot \sin\beta + a_y \cdot \cos\beta - a_z \sin\alpha \cdot \sin\beta) + \quad \text{(Equation 14)}$$
$$p \cdot \sin\alpha - r \cdot \cos\alpha +$$
$$\frac{1}{TAS} \cdot [-u_w \cdot (r \cdot \cos\beta + q \cdot \sin\alpha \cdot \sin\beta) +$$
$$v_w \cdot (p \cdot \sin\alpha \cdot \sin\beta - r \cdot \cos\alpha \cdot \sin\beta) +$$
$$w_w \cdot (p \cdot \cos\beta + q \cdot \sin\beta \cdot \cos\alpha)] + \eta_B$$

$$\dot{W}_N = \eta_{W_N} \quad \text{(Equation 15)}$$

$$\dot{W}_E = \eta_{W_E} \quad \text{(Equation 16)}$$

$$\dot{W}_D = \eta_{W_D} \quad \text{(Equation 17)}$$

where:
α and β are the angles of attach and sideslip, respectively
$h_w$, $v_w$ and $w_w$ are the wind velocity components expressed in the body frame, whereas $W_N$, $W_E$ and $W_D$ are the wind velocity components in the NED frame;
$a_x$, $a_y$ and $a_z$ are the inertial acceleration in the body frame;
p, q and r are roll rate, pitch rate and yaw rate in the body frame, respectively;
TAS is the true air speed
$\eta_\alpha$, $\eta_\beta$, $\eta_{W_N}$, $\eta_{W_E}$ and $\eta_{W_D}$ are the process noises which are assumed to be zero mean multivariate Gaussian noises with covariance matrix $Q_{noise}$.

In some embodiments of the present invention, the following equations, implemented in discrete form, represent EKF measurement equations:

$$\begin{bmatrix} V_N \\ V_E \\ V_D \end{bmatrix} = \overline{R}_{BI} \times \begin{bmatrix} TAS \cdot \cos\alpha\cos\beta \\ TAS \cdot \sin\beta \\ TAS \cdot \cos\beta\sin\alpha \end{bmatrix} + \begin{bmatrix} W_N \\ W_E \\ W_D \end{bmatrix} + \begin{bmatrix} v_{V_N} \\ v_{V_E} \\ v_{V_D} \end{bmatrix} \quad \text{(Equation 18)}$$

$$N_z = Q \cdot (k_1 \cdot \alpha + k_0) + tg(\alpha) \cdot N_x \quad \text{(Equation 19)}$$

where:
$V_N$, $V_E$ and $V_D$ are the inertial velocity components in the NED frame;
$\overline{R}_{BI}$ is the Transformation matrix from body frame to NED frame;
$v_{V_N}$, $v_{V_E}$ and $v_{V_D}$ are the measurement noises which are assumed to be zero mean multivariate Gaussian noises with covariance matrix $R_{noise}$
$N_x$ and $N_z$ are the axial and normal accelerations
$k_1$ and $k_0$ are provided by Equations 1 and 2.

In some embodiments, Equation 19 is obtained assuming negligible thrust contribution to the normal load factor. In some such embodiments, the normal load factor refers to a normal load factor relative to an aerodynamic axis. In other embodiments, Equation 19 is obtained assuming a small angle of attack and/or by approximating a small angle of attack.

Angle of Attack Indication

In some embodiments of the present invention, the system includes an indication algorithm for performing an angle of attack indication function. In some embodiments, the indication algorithm utilizes an estimated angle of attack value that is normalized between maximum and minimum measured angle of attack values. In other embodiments, the indication algorithm performs a function to check if an estimated angle of attack is within an allowable range ($A_OA_{MIN}$ to $A_OA_{MAX}$). In some such embodiments, the allowable range is computed by an initialization function. In other such embodiments, the indication algorithm generates an "Out of Range" code and/or causes a filter reset if the estimated angle of attack is outside of the predetermined range.

In other embodiments of the present invention, the indication algorithm performs a comparison function to determine a color code value and/or a range vector component. In some such embodiments, the comparison function compares the estimated angle of attack to a plurality of predetermined color code thresholds related to predetermined color code values. In some embodiments, at least some of the color code thresholds are based on Installation Parameters and/or Calibration Parameters and/or are provided by an initialization function.

In still other embodiments of the present invention, the indication algorithm causes a display screen to display an AOA Indexer 100, an AOA Meter 200, and/or an AOA Tape 300 so as to provide a user with information. In some such embodiments, the system of the present invention enables a user to select whether a display screen 60 displays the AOA Indexer 100, the AOA Meter 200, and/or the AOA Tape 300.

Some embodiments of an AOA Indexer 100 include one or more graphic element. For instance, some embodiments include at least four distinct graphic elements in the form of a top chevron 110 positioned above a circle 130 and a bottom chevron 120 positioned below the circle 130. In some such embodiments, the circle 130 is represented by an upper portion 132 that is displaced from a lower portion 134 such that the circle 130 graphic is actually two graphics that, when combined, make up the general shape of a circle. Other embodiments of an AOA Indicator include a distinct graphic element in the form of a horizontal bar 140. In some such embodiments, the horizontal bar 140 is positioned below a bottom chevron 120.

Some embodiments of chevrons 110, 120 include at least two opposed angled line segments, each line segment having a proximal end 112, 122 positioned adjacent to and/or slightly displaced from the circle 130 and a distal end 114, 124 displaced away from the circle 130 such that a distance between respective distal ends 114, 124 is greater than a distance between respective proximal ends 112, 122. In some embodiments, the combination of all four line segments roughly represents an "X" shape with a top portion of the "X" shape being represented by the line segments of the top chevron 110, a bottom portion of the "X" shape being represented by the line segments of the bottom chevron 120, and a center portion of the "X" shape being removed so as to not interfere with the ability to visualize the circle 130. In still other embodiments, one or more line segments include one or more portions such that at least one chevron includes a top section and a bottom section. In some such embodiments, the portions of each line segment are spaced apart from each other such that a single line segment appears to be more than one line segment.

Some embodiments of an AOA Meter 200 include a scale graphic 210 having a plurality of tick mark graphics 212 and a needle graphic 220 that is moveable relative to the scale graphic 210 and the tick marks 212 so as to indicate an estimated angle of attack. In some such embodiments, the AOA Meter 200 includes an optimum AOA indicator graphic 230 and/or a critical AOA indicator graphic 240 positioned relative to the scale graphic 210 and the tick marks 212 such that when the needle graphic 220 moves relative to the scale graphic 210 and the tick marks 212, a user is able to determine whether the estimated angle of attack is within an optimum range and/or is nearing a critical value.

In some embodiments, the needle graphic 220 is not displayed when the aircraft is on the ground. In other embodiments, the AOA Meter includes two needle graphics. In some such embodiments, a first needle graphic 220 correlates with a first flap configuration and a second needle graphic 222 correlates with a second flap configuration.

Figure 5A:
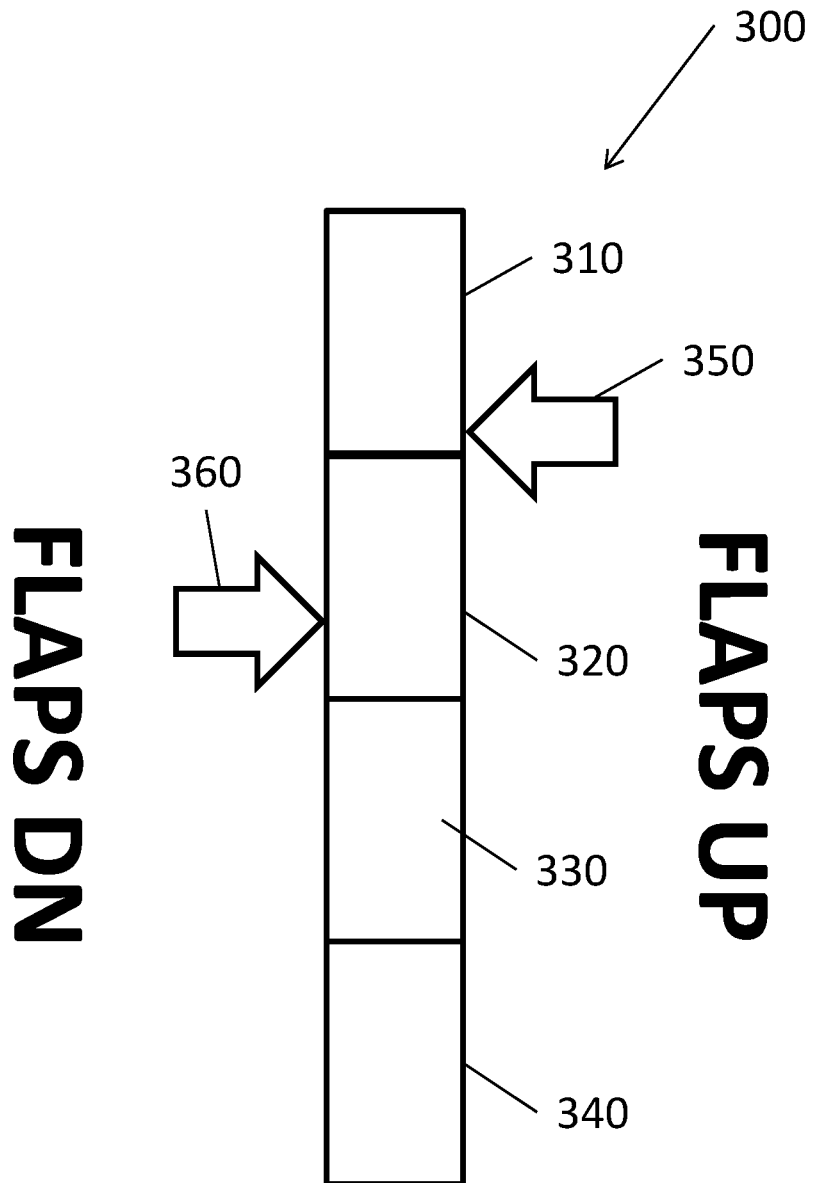
FIG. 5A is a graphical representation of one embodiment of an AOA Tape with Flaps Up and Flap Down indicators.
Figure 5B:
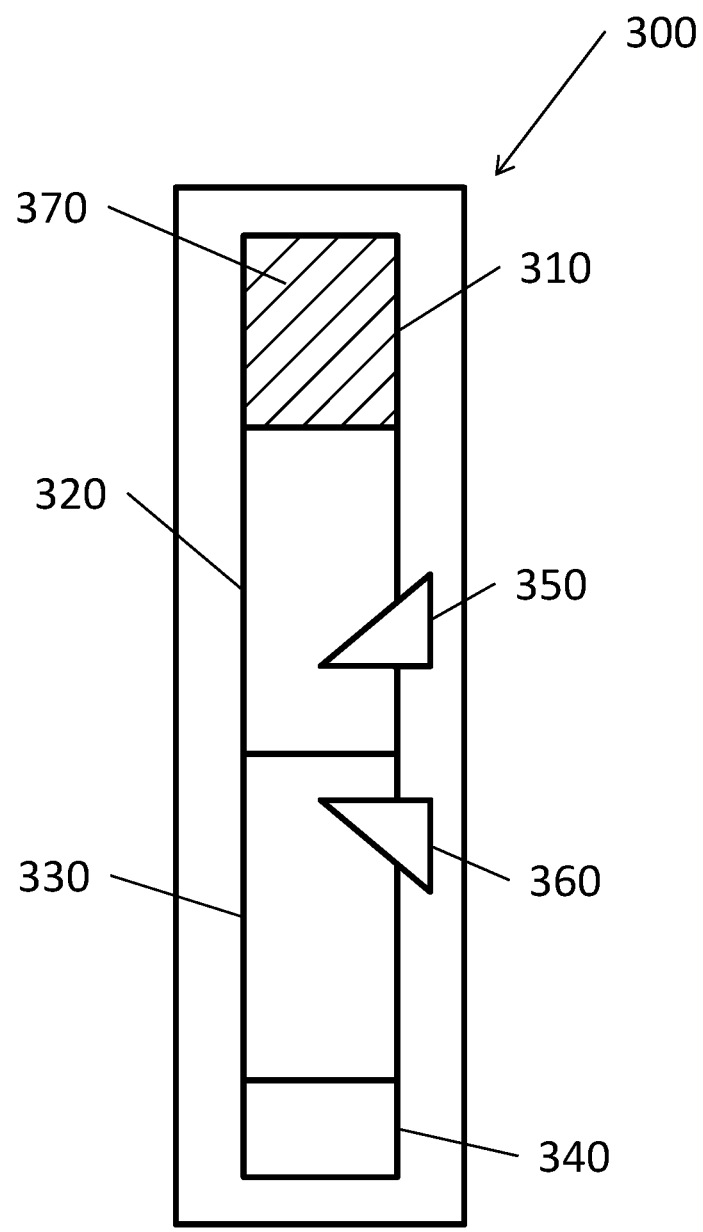
FIG. 5B is a graphical representation of one embodiment of an AOA Tape.
Figure 6:
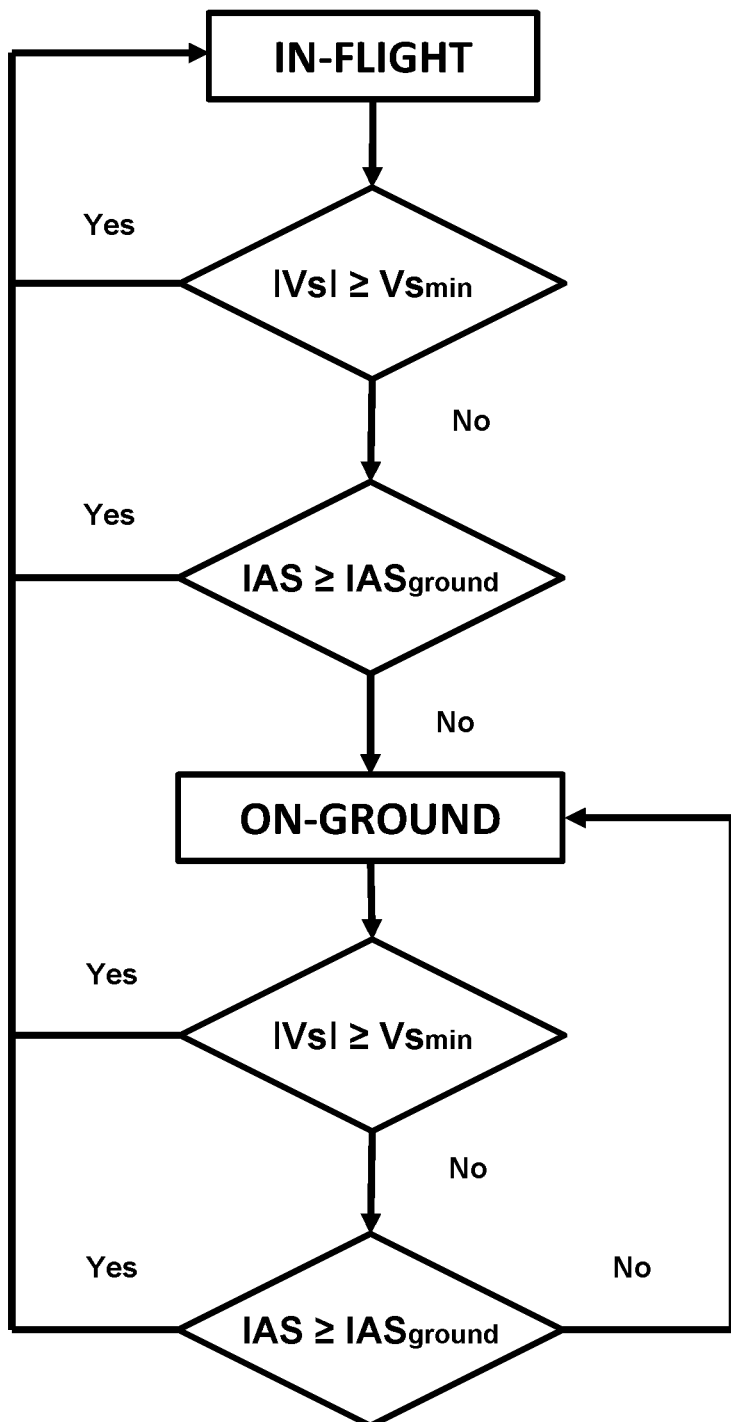
FIG. 6 is a flow chart showing logic for determining if aircraft is on ground or airborne.

Referring to FIGS. 5A and 5B, some embodiments of an AOA Tape 300 include a plurality of colored tape areas, 310, 320, 330, 340. Some such embodiments include a first tape area 310 positioned at a first end of the AOA Tape 300, a fourth tape area 340 positioned at a second end of the AOA Tape 300 and a second 320 and third 330 tape area positioned between the first 310 and fourth 340 tape areas with the second tape area 320 being adjacent to the first tape area 310, the third tape area 330 being adjacent to the fourth tape area 340, and the second 320 and third 330 tape areas being adjacent to each other.

In some embodiments, each colored tape area represents a relative AOA. For instance, in some embodiments, a high AOA near the Critical AOA is indicated by coloring the first tape area 310 red and/or including indicia 370 within the first tape area. In other embodiments, a low AOA is indicated by coloring the fourth tape area 340 blue. In still other embodiments, an AOA associated with normal or optimal approach conditions is indicated by coloring a third tape area 330 green. In yet other embodiments, the second tape area 320 is colored yellow.

Some embodiments of an AOA Tape 300 further include at least one indicator graphic, such as a needle graphic 350. In some such embodiments, the needle graphic is positioned adjacent to one or more tape area 310, 320, 330, 340 and is capable of moving along a length of the tape areas so as to provide an indication of the angle of attack of the aircraft. In other such embodiments, the tape areas 310, 320, 330, 340 are capable of moving relative to the needle graphic 350.

Other embodiments of the AOA Tape 300 further include a first needle graphic 350 and a second needle graphic 360. In some such embodiments, the first 350 and second 360 needle graphics are positioned adjacent to one or more tape area 310, 320, 330, 340 and are capable of moving along a length of the tape areas so as to provide an indication of the angle of attack of the aircraft. In other such embodiments, the tape areas 310, 320, 330, 340 are capable of moving relative to the indicator graphics 350, 360.

In some embodiments, the first 350 and second 360 needle graphics are positioned on opposite sides of the tape areas 310, 320, 330, 340. In other embodiments, the needle graphics are capable of moving independent of each other. In still other embodiments, such as embodiments without a Flap Position Sensor input, the first needle graphic 350 indicates the AOA associated with the aircraft with Flaps Up configuration and the second needle graphic 360 indicates the AOA associated with the aircraft in a Flaps Down configuration. In yet other embodiments, the needle graphics 350, 360 are not displayed when the aircraft is on the ground.

In some embodiments, the indication algorithm determines a configuration for an AOA Indexer 100. In some such embodiments, the determination is linked to a comparison function that compares an estimated angle of attack to a plurality of predetermined threshold values, such as color code thresholds.

In some embodiments of the present invention, the indication algorithm causes the display screen 60 to display an AOA Indexer 100 in one or more color so as to provide information to a user, such as to indicate an algorithm status associated with flight operations. For instance, in some embodiments, the combination of a top red chevron 110 and a bottom red chevron 120 indicates an algorithm status that is associated with normal flight operations (color code 1) and/or an algorithm status that is associated with the detection of a full stall (color code 11). In other embodiments, an algorithm status associated with normal flight operations is indicated by a bottom red chevron 120 (color code 2); a top half 132 of a green circle 130 combined with a bottom red chevron 120 (color code 3); a top half 132 of a green circle 130 (color code 4); a full green circle 130 (color code 5); a bottom half 134 of a green circle 130 (color code 6); a bottom half 134 of a green circle 130 combined with a yellow chevron 110, 120 (color code 7); a yellow chevron 110, 120 (color code 8); at least one yellow chevron 110, 120 combined with a horizontal blue bar 140 (color code 9); and/or a horizontal blue bar 140 (color code 10). In still other embodiments, none of the graphic elements are displayed during normal on-ground operations and/or any graphic elements displayed are subdued and/or otherwise altered (color code 12). In yet other embodiments, a red "X" is displayed on the display screen 60 to indicate an algorithm status associated with abnormal operations of the aircraft and/or abnormal operations of the system of the present invention. In other words, the indication algorithm provides an indication to a user when a system anomaly exists.

In some embodiments, the system includes one or more codes that correlates with one or more angles of attack. For instance, in some such embodiments: Code 1 correlates with an angle of attack associated with a stall warning when the aircraft is in a flaps down configuration; Code 2 correlates with an angle of attack associated with a stall warning when the aircraft is in a flaps up configuration; Code 3 correlates with an angle of attack that is approaching stall proximity when the aircraft is in a flaps up configuration; code 4 correlates with an angle of attack that is just above optimum condition for approach and landing in clean configuration; Code 5 correlates with an angle of attack that is an optimum condition for approach and landing in clean configuration; Code 6 correlates with an angle of attack that is just below optimum condition for approach and landing in clean configuration; Code 7 correlates with an angle of attack that is associated with a first set of low angle of attack operations; Code 8 correlates with an angle of attack that is associated with a second set of low angle of attack operations; Code 9 correlates with an angle of attack that is associated with a third set of low angle of attack operations; Code 10 correlates with an angle of attack that is associated with a fourth set of low angle of attack operations and/or cruise operations; and/or Code 11 correlates with an angle of attack that is associated with a full stall.

In some embodiments of the present invention, the indication algorithm causes the display screen 60 to display an AOA Meter 200 so as to provide information to a user. In some embodiments, the display screen 60 displays a needle graphic 220 in various positions relative to a scale graphic 210 depending on an estimated angle of attack value. In some such embodiments, as the estimated angle of attack value changes, the indication algorithm causes the display screen 60 to reposition the needle graphic 220 relative to the scale graphic 210 so as to provide the illusion of a physical needle moving relative to a physical scale. In other embodiments, the needle graphic 220 is positioned relative to an optimum AOA indicator graphic 230 when an algorithm status is associated with an optimum angle of attack. In still other embodiments, the needle graphic 220 is positioned relative to a critical AOA indication graphic 240 when an algorithm status is associated with the detection of a full stall. In yet other embodiments, the needle graphic 220 is not displayed during normal on-ground operations. In still yet other embodiments, a red "X" is displayed on the display screen 60 to indicate an algorithm status associated with abnormal operations of the aircraft and/or abnormal operations of the system of the present invention.

Full Stall Detection

In still other embodiments of the present invention, the indication algorithm performs a detection function to detect whether the aircraft is in a full stall. In some embodiments, the detection function utilizes information that was computed during a calibration flight test, such as the calibration gains. In other embodiments, a nominal relation between the reciprocal of indicated air speed ("IAS") squared and angle of attack can be drawn. In some such embodiments, the nominal relation is based on calibration gains. In other such embodiments, an aircraft can stall only if the indicated airspeed of the aircraft is below a threshold indicated airspeed ("IAS$_{thres}$"). In still other such embodiments, a threshold indicated airspeed value is equal to the flap-up stall speed ("V$_S$") of the aircraft times a safety scale factor ("K"). In some such embodiments, the safety scale factor is greater than 1.

$$IAS_{thres} = K \cdot V_S \quad \text{(Equation 20)}$$

In some embodiments, the indication algorithm calculates an allowable band for the angle of attack of the aircraft for each value of indicated airspeed that is less than the threshold indicated airspeed. In some such embodiments, the calculation of the band takes into account the admissible estimation error on the angle of attack and the indicated airspeed measurement error. The allowable band is defined by an upper limit ("AOAupper") and a lower limit ("AOAlower"). In such an embodiment, the indication algorithm declares a full stall if the aircraft's airspeed is lower than the indicated airspeed threshold and the estimated angle of attack is either higher than the upper limit of the allowable band or lower than the lower limit of the allowable band. In other embodiments, the indication algorithm does not declare a full stall if the aircraft's indicated airspeed is higher than an indicated airspeed threshold and/or if an estimated angle of attack of the aircraft is within an allowable band. In still other embodiments, information of a full stall is included into a color code.

Weight Estimation

In some embodiments the conventional weight is used for all computation. In some other embodiments, the weight is gathered from other devices 80 or inserted directly by the pilot into the system. In still other embodiments, the aircraft weight is roughly estimated soon after take-off by using a best matching comparison with calibration parameters or other equivalent means to establish current weight ratio with respect to the calibration conditions.

AOA Ranges

In still other embodiments of the present invention, the system provides maximum and minimum values for a plurality of ranges, such as a Clean Critical AoA range, a Clean Optimum AoA range, a Dirty Critical AoA range, and/or a Dirty Optimum AoA range. In some such embodiments, the system includes a Clean Critical Max AoA component, a Clean Optimum Minimum AoA component, a Dirty Critical Max AoA component, and a Dirty Optimum Minimum AoA component. In other embodiments, the system provides a maximum angle of attack component and/or a minimum angle of attack component. In some such embodiments, the maximum and minimum angle of attack components represent the maximum and minimum calculated angle of attack values, respectively, that were used to normalize the angle of attack value so as to generate an estimated angle of attack value. In some embodiments, the various angle of attack components are utilized to set color coded areas for an AOA meter and/or for an AOA Tape.

Guard Functions

In some embodiments of the present invention, the system includes a monitoring algorithm for performing one or more guard function, such as a flight phase function, an enabling signal computation function, and/or an in-flight verification function.

A flight phase function is utilized by the monitoring algorithm to determine the flight phase status of an aircraft. In some embodiments, the flight phase status is automatically set to an in-flight status when the system of the present invention is turned on. In other embodiments, the flight phase function compares measurements of vertical speed ("Vs") and/or indicated airspeed ("IAS") to threshold values to determine whether the flight phase status of the aircraft should: be changed from in-flight to on-ground; be changed from on-ground to in-flight; be left as in-flight; or be left as on-ground. In some such embodiments, the threshold values, such as minimum vertical speed threshold ("Vs$_{min}$"), minimum indicated airspeed ("IAS$_{min}$"), and/or flight airspeed ("IAS$_{flight}$"), are computed from Installation Parameters. For instance, in some embodiments, the flight phase function calculates that the aircraft is on the ground if the measured vertical speed is less than the vertical speed threshold and if the measured airspeed is less than the minimum indicated airspeed. In other embodiments, the flight phase function calculates that the aircraft is in flight if the measured airspeed is greater than the flight airspeed.

In some embodiments, the flight phase status of the aircraft is only changed if a condition for changing the flight phase status is held for a suitable continuous amount of time. In some such embodiments, 3 seconds is a suitable continuous amount of time. In other such embodiments, less than 3 seconds is a suitable continuous amount of time.

An enabling signal computation function is utilized by the monitoring algorithm to determine whether an angle of attack estimation function of the present invention should be enabled. In some embodiments, the enabling signal computation function calculates that the angle of attack estimation function should be enabled if all the input measurements are valid, the aircraft is in flight, the Calibration Parameters and Installation Parameters are valid, and a calibration procedure is disabled.

An in-flight verification function is utilized by the monitoring algorithm to determine if an angle of attack estimation is correct. In some embodiments, the in-flight verification function compares the mean values on a suitable time frame of the measured pitch angle and of the estimated angle of attack. In some such embodiments, the in-flight verification function calculates that the angle of attack estimation is correct if the values are almost equal. In other such embodiments, the in-flight verification function is only utilized by the monitoring algorithm if the aircraft is in level flight and flaps are not deployed. In some such embodiments, the monitoring algorithm determines whether the flaps are up by comparing the indicated airspeed with the maximum flaps extended speed.

System Limitation Embodiments

Some embodiments of the present invention are configured to only work properly with certain classifications of aircraft and/or to only work with aircraft that meet certain requirements. For instance, in some embodiments, the system is configured such that it only works properly with aircraft having a max thrust that is less than the aircraft weight. In other embodiments, the aircraft must be a fixed-wing aircraft with a conventional configuration. A conventional configuration can include a fixed-wing aircraft having a main wing and a horizontal tail displaced aft of the main wing. The main wing defines a main wing surface area and the horizontal tail defines a horizontal tail surface area. In some embodiments of an aircraft having a conventional configuration, the main wing surface area must be greater than the horizontal tail surface area.

Some embodiments of the present invention are disabled when the aircraft is on the ground.

Some embodiments of the present invention are not affected by at least some common flight variables, such as temperature and altitude. Other embodiments of the present invention, such as embodiments that don't have access to weight and/or flap measurements and/or information, are only slightly affected by at least some common flight variables, such as aircraft weight and flaps position. In some such embodiments, the resulting dependence of such common flight variables is within the general range of accuracy of the system and/or is polarized in a conservative way such that the system is configured to provide a more critical angle of attack indication when such common flight variables results in uncertainty between a less critical angle of attack indication and the more critical angle of attack indication.

Methods of Installing the System

The present invention further includes a method of installing the system on an existing aircraft. Some methods include uploading a software package into a database of the system. The database is in data communication with a system processor such that the software package is capable of influencing and/or controlling the system processor. The method of installing the system further includes establishing a data connection between the system processor and one or more existing aircraft components. Some such aircraft components include an air data computer 20, an attitude and heading reference system 30, a global positioning system 40, a configuration module 50, and a display screen 60. In some embodiments, the air data computer 20 and the attitude and heading reference system 30 are each included in an air data computer and attitude heading reference system. In other embodiments, the display screen, the system database, and/or the system processor are included as part of a display apparatus, such as ASPEN's Evolution Flight Display. In still other embodiments, the software package is installed onto a system that utilizes a dedicated display, such as a display having LEDs with a microprocessor. In yet other embodiments, the software package is installed onto a system that includes a voice-only annunciations, such as when a display is unavailable. In still yet other embodiments, the software package is installed onto a system that includes a surrogate of a stick shaker, such as in cases that a stall warning is not available.

Method of Calculating an Estimated Angle of Attack

The present invention further includes a method of calculating an estimated angle of attack of the aircraft. In some embodiments, the method includes utilizing an Extended Kalman Filter to combine information from a variety of sources, such as information pertaining to an estimated aerodynamic model for the aircraft.

In some embodiments, the system includes a method of verifying the calibration process prior to enabling a method of calculating an estimated angle of attack. In some such embodiments, the system assesses at least some of the information received during the calibration process, including assessing whether the information was correctly acquired. In other such embodiments, the system assesses whether the calibration procedure was and/or is being correctly executed. In still other such embodiments, the system assesses whether the system has enough information to even begin a calibration process and/or a process of estimating an angle of attack.

Method of Indicating an Estimated Angle of Attack

The present invention further includes a method of indicating an estimated angle of attack. In some embodiments, the method includes comparing an estimated angle of attack value to one or more threshold values and to assign a code to the estimated angle of attack value based on the relationship of the angle of attack value to the one or more threshold values. In some such embodiments, the method further includes providing an indication to a user of the system, the indication being dependent on the code assigned to the estimated angle of attack value. In other embodiments, the method includes providing an indication to a user of the system, the indication being dependent on the value of the estimated angle of attack value. In some such embodiments, the method further includes providing an indication of an optimum angle of attack range and/or a critical angle of attack value such that a user of the system can determine whether the current estimated angle of attack is within the optimum angle of attack range and/or whether it has reached the critical angle of attack value.

In some embodiments of the present invention, all information that is received from external sensors is received from existing external sensors. Similarly, all information that is derived from information received from external sensors is derived from information received from existing external sensors. Consequently, the method of installing the system on the existing aircraft does not require puncturing the skin of the aircraft. Furthermore, the present invention does not require a dedicated angle of attack sensor. Instead, the present invention utilizes existing sensors and systems to derive an angle of attack of the aircraft.

Performing Calibration and Estimation Together

Some embodiments of the present invention include a procedure for identifying automatically some parameters of a specific aircraft during a calibration flight. In some such embodiments, at least some of the parameters are Calibration Parameters. In other such embodiments, the procedure does not require information from and/or knowledge of additional sensors, such as a dedicated angle of attack sensor, and/or an aerodynamic model, for subsequent use of the identified parameters for angle of attack estimation. In this way, the system does not require prior knowledge of aerodynamic models, does not require expensive aerodynamic analysis, and/or does not require specific sensors. In some embodiments, the procedure utilizes one or more of the above defined equations, and/or other equations as necessary, to perform system calibration and angle of attack estimation together.

Pre-Calibration Flights

In some embodiments of the present invention, a pre-calibration flight is conducted to establish stall horn airspeeds, such as stall horn airspeeds associated with the aircraft being in the flaps up and the flaps down configuration. In other embodiments, a pre-calibration flight is not necessary because the stall horn speeds are known and/or can be predicted with relative certainty.

Calibration Flights

In some embodiments of the present invention, a calibration flight is conducted after an installation menu is set up and equipment checkouts are completed. In some such embodiments, the system of the present invention and associated inputs, such as GPS inputs, must be operating normally prior to and during the calibration flight. In other such embodiments, the installation menu comprises one or more feature, each feature being associated with one or more option.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of indicating an angle of attack of an aircraft, the method comprising:
    providing a configuration module with installation parameters of the aircraft prior to a calibration flight of the aircraft;
    receiving by a system processor true airspeed data, indicated airspeed data, and climb rate data from an air data computer during flight operations of the aircraft;
    receiving by the system processor aircraft acceleration data, aircraft attitude data, and data pertaining to aircraft's rate of angular movement from an inertial and heading reference system during the flight operations;
    receiving by the system processor ground speed data and track angle data from a global positioning system during the flight operations;
    performing at least one calibration flight so as to determine calibration parameters;
    utilizing at least some of the calibration parameters to estimate aircraft characteristics;
    storing the installation parameters and at least one of the calibration parameters or
    information pertaining to the estimated aircraft characteristics in the configuration module;
    estimating the angle of attack of the aircraft during the flight operations; and
    displaying an indication of the angle of attack of the aircraft,
    wherein during the flight operations the system processor is in data communication with the air data computer, attitude and acceleration sensor system, the global positioning system, and the configuration module,
    wherein the estimating step is performed by the system processor,
    wherein the displaying step is performed by a display screen, the display screen being positioned within the aircraft so as to be visible to a pilot of the aircraft during flight operations, and
    wherein the step of displaying an indication of the angle of attack of the aircraft includes
    displaying a graphic indication of the angle of attack in a form of an AOA Indexer having a top chevron, a bottom chevron, and a circle positioned between the top and bottom chevrons.

2. The method of claim 1, wherein the system processor does not receive data from a dedicated angle of attack sensor.

3. The method of claim 1, further comprising obtaining information associated with a current flap configuration of the aircraft.

4. The method of claim 1, further comprising assigning a code to the estimated angle of attack, the code being assigned based on the estimated angle of attack's relationship to one or more angle of attack threshold value.

5. The method of claim 4, wherein the displaying step is dependent on the assigning step.

6. The method of claim 4, wherein at least one angle of attack threshold value is associated with an optimum angle of attack for the aircraft.

7. The method of claim 4, wherein at least one angle of attack threshold value is
    associated with a critical angle of attack for the aircraft.

8. The method of claim 1, further comprising receiving weight data.

9. The method of claim 8, wherein the system processor is in data communication with a weight sensor so as to enable the system processor to receive weight data from the weight sensor.

10. The method of claim 8, wherein the system processor is in data communication with a user input device so as to enable the system processor to receive weight data from the user input device, the user input device being configured to allow a user to input weight data into the user input device.

11. The method of claim 8, wherein the weight data is estimated by a weight estimation algorithm that utilizes data from the calibration flight.

12. The method of claim 1, wherein the AOA Indexer further includes a horizontal bar positioned below the bottom chevron.

13. A method of indicating an angle of attack of an aircraft, the method comprising:

providing a configuration module with installation parameters of the aircraft prior to a calibration flight of the aircraft;
receiving by a system processor true airspeed data, indicated airspeed data, and climb rate data from an air data computer during flight operations of the aircraft;
receiving by the system processor aircraft acceleration data, aircraft attitude data, and
data pertaining to aircraft's rate of angular movement from an inertial and heading reference system during the flight operations;
receiving by the system processor ground speed data and track angle data from a global positioning system during the flight operations;
performing at least one calibration flight so as to determine calibration parameters;
utilizing at least some of the calibration parameters to estimate aircraft characteristics;
storing the installation parameters and at least one of the calibration parameters or information pertaining to the estimated aircraft characteristics in the configuration module;
estimating the angle of attack of the aircraft during the flight operations;
displaying an indication of the angle of attack of the aircraft; and
determining by the system processor whether the aircraft is in flight, such determination being made by:
  comparing a number of consecutive measurements of vertical speed to a minimum vertical speed threshold; and
  comparing a number of consecutive measurements of indicated airspeed to a minimum indicated airspeed threshold,
wherein at least one set of the number of consecutive measurements of vertical speed and indicated airspeed completely overlaps with the other another set,
wherein during the flight operations the system processor is in data communication with the air data computer, attitude and acceleration sensor system, the global positioning system, and the configuration module,
wherein the estimating step is performed by the system processor, and
wherein the displaying step is performed by a display screen, the display screen being positioned within the aircraft so as to be visible to a pilot of the aircraft during flight operations.

* * * * *